United States Patent [19]

Heckenkamp

[11] 4,235,415
[45] Nov. 25, 1980

[54] AUXILIARY SPRING ASSISTED VALVE LINKAGE

[75] Inventor: Edward B. Heckenkamp, Brookfield, Wis.

[73] Assignee: Allis-Chalmers Corporation, Milwaukee, Wis.

[21] Appl. No.: 972,475

[22] Filed: Dec. 22, 1978

[51] Int. Cl.³ .............................................. F15B 13/06
[52] U.S. Cl. ........................................ 251/77; 91/426; 137/596.1; 137/625.69; 192/12 C; 251/294
[58] Field of Search .......... 91/426; 137/596.1, 625.69; 192/12 C; 251/77, 294

[56] References Cited

U.S. PATENT DOCUMENTS 3,195,574  7/1965  Carls ................................ 137/625.69
3,722,542  3/1973  Matthews et al. ................. 137/596.1
4,017,221  4/1977  Dezelan ............................. 251/78 X

FOREIGN PATENT DOCUMENTS 697232  10/1940  Fed. Rep. of Germany ...... 137/625.66

Primary Examiner—Gerald A. Michalsky
Attorney, Agent, or Firm—Arthur L. Nelson

[57] ABSTRACT

A pressure biased control valve holding the valve in the actuated position against the force of a return spring operating in connection with a linkage having a separate return spring and a loss motion connection to allow the valve and linkage to operate independently to the return position and assure the pressurized fluid in the valve maintains the valve in the actuating position regardless of pressure changes in the hydraulic system.

10 Claims, 3 Drawing Figures

AUXILIARY SPRING ASSISTED VALVE LINKAGE

This invention relates to a valve and a control linkage and more particularly to a pressure biased valve biased to the actuating position and a valve return spring to return the valve to the return position when the pressure returns to zero in the hydraulic system. A loss motion connection between the linkage and the valve permits the linkage to return to the retracted position by a separate spring to assure that the linkage will not impede movement of the valve from the actuated to the return position. Separate operation also prevents spurious pressure changes in the hydraulic system causing the valve to return to the return position during operation.

Pressure biased valves such as power take-off valves and differential lock valves hold the valve in the actuated position in response to the presence of pressurized fluid in a fluid pressure chamber. Once the pressure decays subsequent to stopping the engine and the pump, the valve returns to the return position. In the case of the power take-off valve, the brake will be actuated when the pump is again started and pressure returns to the system. When the power take-off valve is in the return or brake position, it prevents a live power take-off shaft from causing injury to the operator. Accordingly, this invention provides for return of the valve to the return position responsive to a spring in the valve and the spring used is not strong enough to return the valve due to spurious pressure changes in the hydraulic system and to interrupt power through the power take-off shaft. This invention provides for a lighter spring to operate the valve to assure the valve returns to the return or brake position when the pump is stopped but allows the linkage to operate as a separate mechanism through a loss motion mechanism and return the linkage to the return position independently of the valve. This avoids the problem in which power may be interrupted by returning the valve to the return position because of pressure changes in the system and not returning only because the pump is stopped and pressure has dropped to zero in the system.

It is an object of this invention to provide a pressure biased valve and linkage with separate return springs on the valve and the linkage and a loss motion connection between the valve and the linkage to prevent the valve from returning to the return position responsive to minor pressure variations in the system.

It is another object of this invention to provide a valve and linkage with a pressurized biased valve to hold the valve in the actuating position responsive to pressure in the system against the force of the return spring. A lighter return spring is used in the control valve to return the control valve to the return position when the pump is stopped. The provision of a separate return spring on the linkage and the loss motion connection between the valve and linkage assures that the linkage returns to zero independently of the valve.

It is a further object of this invention to provide a pressure biased valve and a return spring on the spool to return the valve to the return position when the pressure drops in the system because the pump is stopped. The operating linkage is connected to the valve through loss motion connection and a return spring returns the linkage to the return position. The loss motion connection permits independent operation of the valve and linkage and assures that the valve will not move to the return position responsive to minor variations in the hydraulic system.

The objects of this invention are accomplished by providing a power take-off valve which is pressure biased to the actuating position by the actuating fluid in the valve which normally is in communication with a hydraulic actuator in the power take-off clutch. A light spring is provided in the valve to assure that the valve is returned to the brake position when the pump is stopped and pressure in the system drops to zero.

When the pressure builds up in the system again as the pump starts, the valve remains in the brake position and the power take-off shaft is braked to avoid a live power take-off shaft as a safety precaution. A linkage for operating the valve is connected through a loss motion device which allows the linkage to operate separately from the valve and the linkage also includes a return spring which returns the linkage to a return position subsequent to actuation of the valve. The spring in no way affects the operation of the valve but returns the linkage to an intermediate position. Manual movement of the linkage will reposition the linkage in the return position. This in turn will move the control valve to the brake or return position.

Referring to the drawings, the drawings illustrate a pressure biased valve operated by linkage through a loss motion connection. Each figure shows a different position of the valve and linkage.

Figure 1:
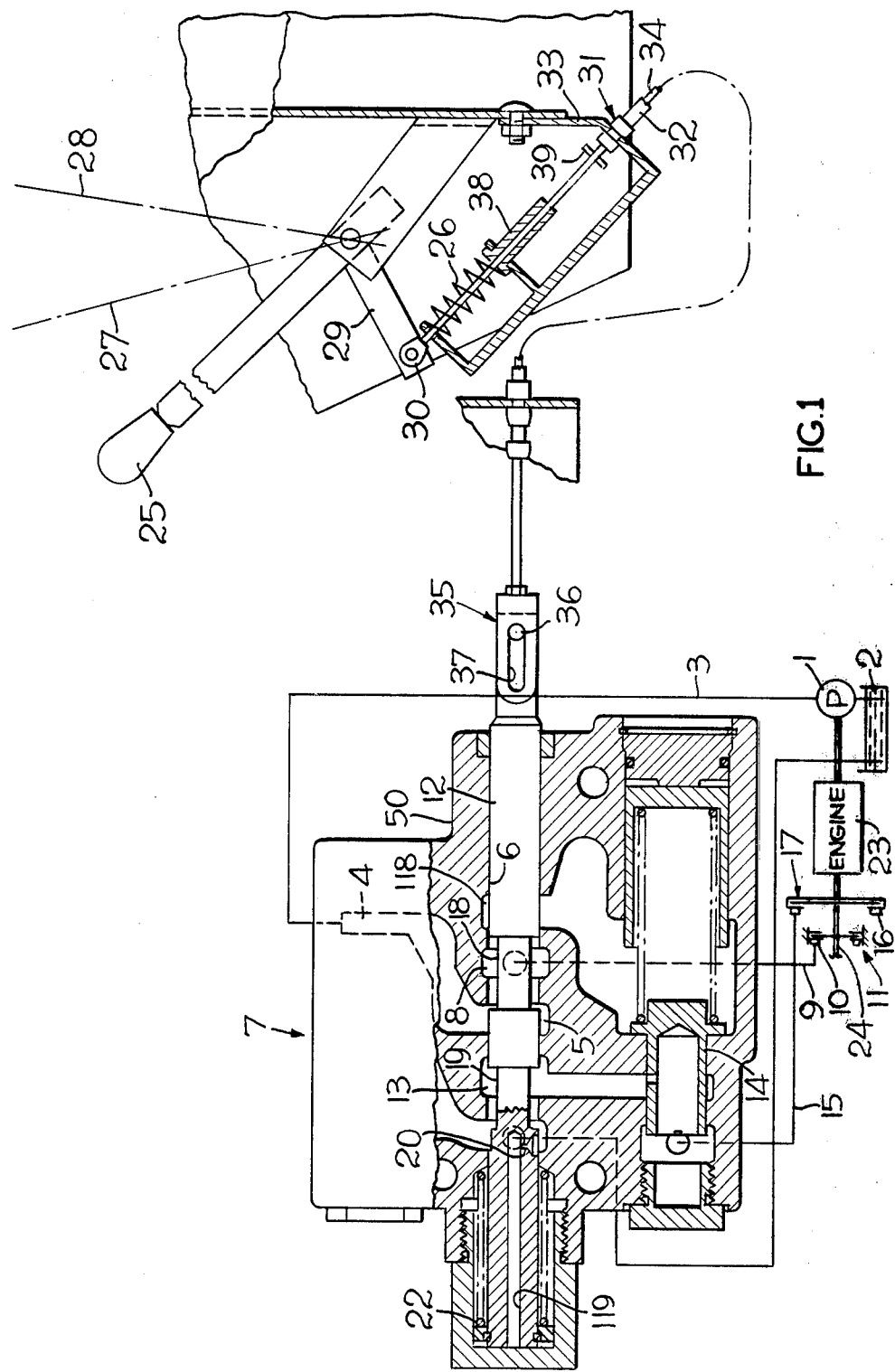
FIG. 1 shows the valve in the return or brake position supplying pressurized fluid to the brake and the linkage in the return position.

Referring to the drawings, FIG. 1 illustrates a pump 1 operating from a sump 2 to pressurize fluid in the conduit 3. Conduit 3 is connected to the inlet passage 4 and the inlet chamber 5 which is in communication with the central opening 6 in the housing 50 which receives the spool 12 of valve 7. As shown, the inlet chamber 5 is in communication with the brake actuating chamber 8. The brake actuating chamber 8 is in communication with the conduit 9 and the hydraulic actuator 10 in the brake 11.

Figure 2:
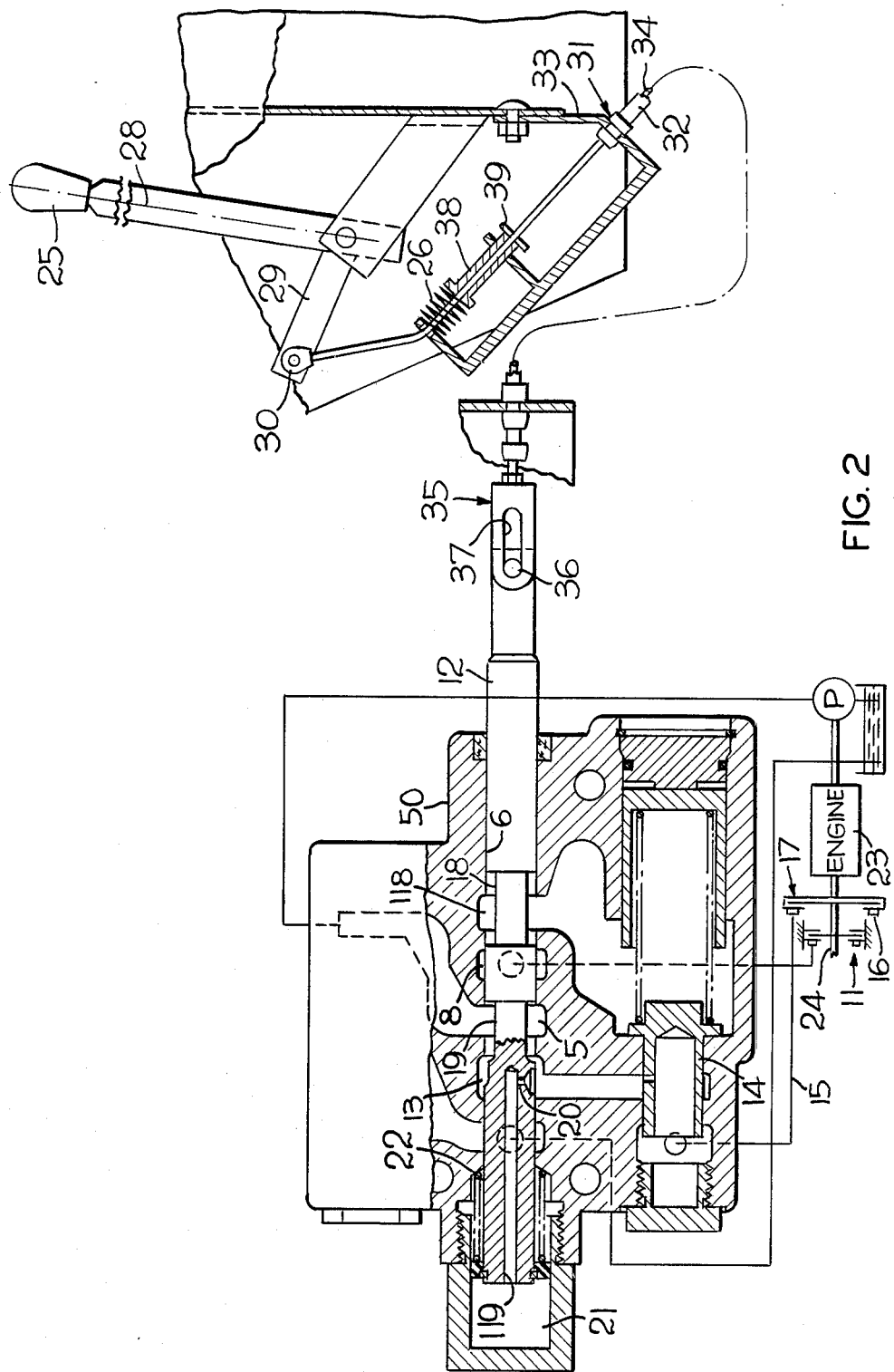
FIG. 2 is a view illustrating the valve in the clutch actuating position and the linkage in the clutch actuating position.
Figure 3:
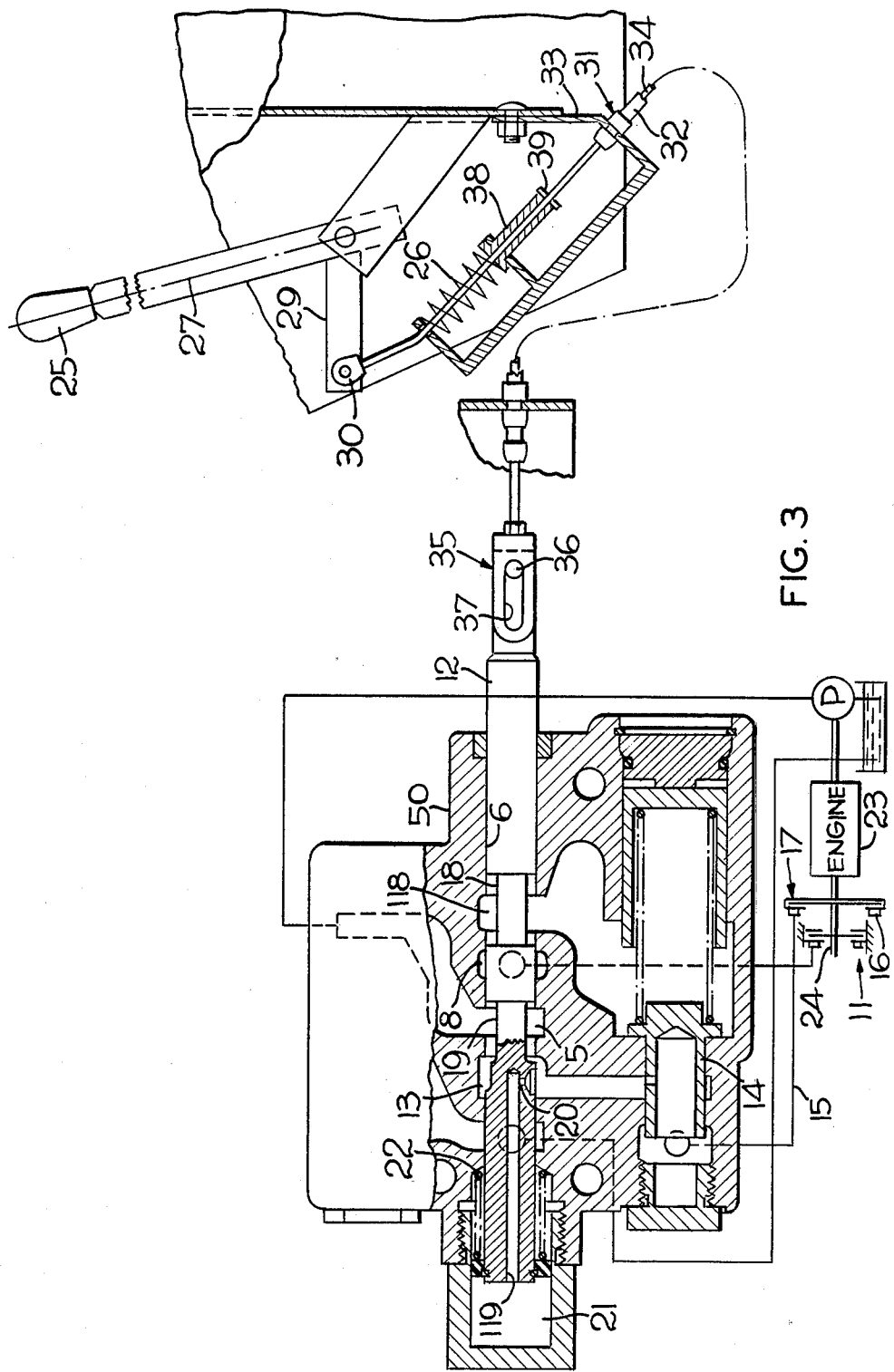
FIG. 3 illustrates the valve in the clutch actuating position and the lever in the intermediate position which is between the clutch actuating and return position.

FIGS. 2 and 3 shows the spool 12 in a position in which the inlet chamber 5 is in communication with the pressure limiting valve 14 and the conduit 15. Conduit 15 is in communication with the hydraulic actuators 16 of the clutch 17. The spool 12 is formed with annular grooves 18 and 19 to selectively provide communication between the inlet chamber 5 and the brake and clutch actuating chambers 8 and 13 as it reciprocates in central opening 6.

The spool 12 is also provided with a central passage 119 which extends axially to the radial opening 20. The radial opening 20 is in communication with the inlet chamber when the spool valve is in the clutch actuating position as shown in FIGS. 2 and 3. Accordingly, the pressure in the fluid pressure chamber 21 is sufficient to retain the valve in the clutch actuating position as shown against the biasing force of the return spring 22. Manual control means are provided to selectively operate the spool 12 for communication between the inlet chamber 5 and the brake and clutch.

Normally, the spool 12 is returned to the brake position as shown in FIG. 1 when pressure in the system is zero because the pump 1 is not operating.

The pump 1 is operating when the engine 23 is running. Engine 23 drives the power take-off shaft 24 through the clutch 17. The clutch 17 is disengaged when the brake 11 is actuated. The brake is actuated when the clutch is in the position as shown in FIG. 1 which prevents power take-off shaft from rotating as a safety precaution when the engine is started.

The control valve 7 can be operated manually by the lever 25 which is shown in the brake or return position in FIG. 1. The lever 25 is normally retracted from the clutch actuating position by the spring 26 to the intermediate position 27 when the lever 25 is released. The lever is shown in the clutch actuating position 28 in FIG. 2. The lever is shown retracted to the intermediate position in FIG. 3. The lever 25 operates through the arm 29 which is connected through the connector 30 to the sheathed cable 31. The sheath 32 of the sheathed cable 31 is fastened to the bracket 33. The cable 34 within the sheath 32 operates the clevis 35 which provides a loss motion mechanism with the spool 12. The spool 12 is provided with a pin 36 received in the slot 37 of the clevis 35. The clevis allows separate movement between the spool and the cable 34. The lever 25 operates against the spring 26 and the sleeve 38 mounted on the cable 34. The pin 39 on the cable operates against the sleeve 38 as shown in FIG. 2 and is moved away from the sleeve 38 as shown in FIG. 1 when the lever 25 is pivoted into the brake actuating position. In the clutch actuating position, pin 39 presses against the bottom of sleeve 38 which carries the sleeve upwardly compressing the spring 26 as shown in FIG. 2. Normally, the spring 26 will return the lever 25 to the intermediate position 27 as shown in FIG. 3 when the lever is released.

The device operates in the following described manner.

FIG. 1 shows the brake actuating position of the valve in which the return spring 22 biases the spool 12 to the return position. The brake lever 25 is pivoted in a counterclockwise direction causing the cable 34 to force the clevis 35 to engage the pin 36. The pin 36 on the spool 12 presses against the spool to the position as shown in FIG. 1. This position of the brake lever is achieved through manual operation. Normally, the spool 12 of the control valve will move to the brake position when pressure returns to zero in the pressurizing chamber 21. This condition exists when the pump is stationary.

When the clutch is actuated as shown in FIG. 2, the spool is moved to the position as shown. The lever 25 is pivoted in a clockwise direction causing the sleeve 38 to move upwardly to compress the spring 26 since the pin 39 engages the bottom end of the sleeve 38. This position is achieved manually by rotating the lever 25 in a clockwise direction. The cable 34 and clevis 35 move in the right hand direction carrying the pin 36 and spool 12 to the position as shown in FIG. 2. The lever 25 will not remain in this position when the lever is manually released. The spring 26 will cause the lever to move to a relaxed position as shown in FIG. 3. Pressurized fluid from the pump outlet in the inlet chamber 5 will flow into the clutch chamber 13 and through the radial passage 20 and the axial passage 119 to the fluid pressure chamber 21. The fluid pressure in the chamber 21 is sufficient to overcome the force of the spring 22 and maintain the spool in the clutch engaging position so long as there is pressure in the system. The spring 22 is a relatively weak spring and the pressure maintains the power take-off shaft in the operating position.

The lever 25 returns to the intermediate position as shown in FIG. 3. The spool remains in the clutch actuating position as shown in FIG. 3. When pressure decreases in the pressurizing chamber 21, the spring automatically returns the spool to the brake position of the spool as shown in FIG. 1. The lever can be returned to the brake position if desired, manually.

The embodiments of the invention in which an exclusive property or privilege is claimed are defined as follows:

1. A control valve comprising, a housing defining a central opening, a spool reciprocally mounted in said central opening of said housing, resilient means normally biasing said spool toward a return position, said housing and said spool selectively defining an operating position and a return position of said spool, said housing and said spool defining a fluid pressure chamber for receiving pressurized fluid for biasing said spool to the operating position, passage means defining by said housing and said spool for supplying pressurized fluid to said fluid pressure chamber when said spool is in the operating position, an actuating linkage for selectively positioning said valve in the operating position and the return position, a loss motion connection for connecting said linkage to said spool to permit said linkage to move to an intermediate position when said spool is in the operating position, biasing means normally biasing said linkage to the intermediate position when said linkage positions said spool in the operating position and is manually released and thereby permitting said spool to remain in the operating position regardless of the spurious decreases of pressure in said pressure chamber.

2. A control valve as set forth in claim 1 wherein said control valve defines a power take-off control valve.

3. A control valve as set forth in claim 1 wherein said control valve defines a differential lock control valve.

4. A control valve as set forth in claim 1 wherein said operating position defines a clutch operating position, said return position defines a brake operating position.

5. A control valve as set forth in claim 1 wherein said loss motion connection defines a slot and a pin allowing said linkage to move relative to said spool.

6. A control valve as set forth in claim 1 wherein said resilient means in said valve defines a spring, said biasing means in said linkage defines a second spring.

7. A control valve as set forth in claim 1 wherein said linkage includes a lever, means defining three positions for said lever including a return position, an operating position and an intermediate position.

8. A control valve as set forth in claim 1 wherein said return means in said valve defines a relatively light spring comparative to said biasing means in said linkage which defines a relatively heavy spring.

9. A control valve as set forth in claim 1 wherein said linkage includes a lever defining three positions, an operating position, a return position and an intermediate position, said linkage includes a cable transmitting motion from said lever to said spool, said spool defines two positions, the return position and an operating position.

10. A control valve as set forth in claim 1 wherein said loss motion connection includes a clevis having a slot, a pin on said spool received in said slot.

* * * * *